US012803987B2

(12) United States Patent
Yogaratnam

(10) Patent No.: US 12,803,987 B2
(45) Date of Patent: Nov. 17, 2026

(54) SYSTEM AND METHOD FOR PROVIDING MULTI-FUNCTIONAL FRAMEWORK TO PERFORM USER-SPECIFIED TASKS

(71) Applicant: Jeysen Zivan Yogaratnam, Las Vegas, NV (US)

(72) Inventor: Jeysen Zivan Yogaratnam, Las Vegas, NV (US)

(73) Assignee: Jeysen Zivan Yogaratnam, NV (US)

( * ) Notice: Subject to any disclaimer, the term of this patent is extended or adjusted under 35 U.S.C. 154(b) by 0 days.

(21) Appl. No.: 19/201,487

(22) Filed: May 7, 2025

(65) Prior Publication Data

US 2025/0358290 A1 Nov. 20, 2025

Related U.S. Application Data

(60) Provisional application No. 63/647,922, filed on May 15, 2024.

(51) Int. Cl.
*H04L 9/40* (2022.01)
*G06F 9/445* (2018.01)
*H04L 67/306* (2022.01)

(52) U.S. Cl.
CPC ........ *H04L 63/102* (2013.01); *G06F 9/44521* (2013.01); *H04L 63/0807* (2013.01); *H04L 63/0861* (2013.01); *H04L 67/306* (2013.01)

(58) Field of Classification Search
CPC ............... H04L 63/102; H04L 63/0807; H04L 63/0861; H04L 67/306; G06F 9/44521
USPC .............................................................. 726/4
See application file for complete search history.

(56) References Cited

U.S. PATENT DOCUMENTS

| | | | | |
|---|---|---|---|---|
| 7,096,491 | B2 * | 8/2006 | Cheng | G06F 21/54 705/52 |
| 2016/0057206 | A1 * | 2/2016 | DeCusatis | H04L 67/10 709/203 |
| 2024/0111852 | A1 * | 4/2024 | Badri | G06F 21/33 |
| 2024/0333705 | A1 * | 10/2024 | Sanchala | H04L 63/20 |
| 2025/0021978 | A1 * | 1/2025 | Balmakhtar | G06Q 20/4014 |
| 2025/0167994 | A1 * | 5/2025 | Baskaran | H04L 63/06 |

* cited by examiner

*Primary Examiner* — Dereena T Cattungal
(74) *Attorney, Agent, or Firm* — Jason C. Cameron

(57) ABSTRACT

A system and a method for providing a multi-functional framework to perform one or more user-specified tasks is disclosed. The system includes a user profile generating subsystem, a data obtaining subsystem, an authentication subsystem, an access control subsystem, and an application programming interface (API) subsystem. Users are authenticated using biometric data, credentials, and metadata before being granted controlled access to in-platform applications such as document management, customer relationship management (CRM), financial operations, and content publishing. The system further integrates third-party applications and tools using API calls initiated via a hypertext preprocessor (PHP) procedure. An artificial intelligence (AI) automation subsystem executes user tasks across integrated environments, while a blockchain activity logging subsystem tracks transactions and rewards users with blockchain-based crypto tokens. The blockchain-based crypto tokens are able to be redeemed for the system services or digital assets.

20 Claims, 7 Drawing Sheets

SYSTEM AND METHOD FOR PROVIDING MULTI-FUNCTIONAL FRAMEWORK TO PERFORM USER-SPECIFIED TASKS

CROSS-REFERENCE TO RELATED APPLICATIONS

This application claims the priority to incorporate by reference the entire disclosure of U.S. provisional patent application No. 63/647,922, filed on May 15, 2024, titled "COLLABORATION PLATFORM FOR START-UP AND SMALL BUSINESS OWNERS"

TECHNICAL FIELD

Embodiments of the present disclosure relate to collaboration platforms, and more particularly relate to a computer-implemented system and a computer-implemented method for providing a multi-functional framework to perform one or more user-specified tasks. The computer-implemented system is directed to a collaboration platform for use by start-up and small business owners and entrepreneurs.

BACKGROUND

In today's digital ecosystem, professionals, entrepreneurs, and small to medium-sized enterprises increasingly rely on a wide array of web-based platforms and software tools to perform daily business operations. These tools span various domains including project management, customer relationship management (CRM), financial accounting, communication, document handling, marketing, and hiring. While availability of such applications offers operational benefits, the fragmentation of these tools across different service providers creates substantial inefficiencies in workflow integration and data synchronization.

Users often find themselves managing multiple logins, disconnected data silos, and redundant tasks across unrelated systems. This lack of interoperability between platforms not only increases administrative overhead but also hampers real-time decision-making and productivity. Furthermore, automation across such disparate systems typically requires expensive custom integrations or third-party middleware, which is cost-prohibitive for startups and small businesses.

Existing identity verification processes within digital platforms are also inconsistent and frequently limited to basic email/password authentication, which exposes collaboration platforms to security vulnerabilities and fraud. Additionally, user engagement within these collaboration platforms is typically linear and transactional, offering little incentive for sustained interaction or contribution, particularly in environments where collaboration and peer-driven value exchange are central.

Moreover, despite a rising adoption of artificial intelligence (AI) and blockchain in enterprise environments, their application in unified, user-friendly platforms remains underutilized. Current web-based platforms often implement these technologies in isolated or overly complex ways that are not scalable or accessible for everyday business users. As a result, many existing solutions fail to deliver a truly intelligent, secure, and rewarding operational environment that fosters both automation and user participation.

Therefore, there is a need for a system to address the aforementioned issues by providing a unified, scalable, and intelligent framework that enables seamless integration of multiple business applications and services. Such a system should allow users to perform a wide range of professional and operational tasks without a friction caused by fragmented platforms, manual data transfers, or redundant workflows. There is also a need for enhanced identity verification mechanisms that go beyond basic login credentials to ensure platform security and trustworthiness. Additionally, it is desirable for the system to support advanced automation capabilities to reduce manual intervention in routine tasks, and to introduce engagement models that encourage consistent user participation through transparent and secure tracking of activities. The solution should also be flexible enough to accommodate third-party tools, ensure interoperability across diverse domains, and leverage emerging technologies such as artificial intelligence and blockchain to elevate user experience and operational efficiency.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for providing a multi-functional framework to perform one or more user-specified tasks is disclosed. In the first step, the computer-implemented method includes generating, by one or more hardware processors through a user profile generating subsystem, a user profile for each user of one or more users to provide access to the multi-functional framework. The one or more user-specified tasks comprises at least one of: document management, project management, social media management, financial management, accounting management activities, scheduling meetings, initiating communication, webinar hosting, video marketing, talent acquisition activities, and consumer transaction services.

In the next step, the computer-implemented method includes obtaining, by the one or more hardware processors through a data obtaining subsystem, at least one of: structured metadata and unstructured metadata from the one or more users associated with the user profile. The structured metadata comprises at least one of: personal identification data, professional information, educational information, professional licenses and certifications, social and online presence data, skill attributes, publication details, geolocation data. The unstructured metadata comprises at least one of: user-generated content, video recordings, image and media uploads, voice inputs, behavioral logs.

In the next step, the computer-implemented method includes authenticating, by the one or more hardware processors through an authentication subsystem, the one or more users based on at least one of: facial imagery data, the structured metadata, the unstructured metadata, government-issued identification documents, video-based character references, and financial account verification data prior to granting access to the multi-functional platform. The authentication subsystem further comprises: a) analyzing the facial imagery data from a real-time video stream to perform facial recognition and liveness detection, b) extracting at least one of: textual features and visual features from the government-issued identification documents using at least one of: an optical character recognition (OCR) and image analysis techniques, and c) mapping at least one of: the textual features and the visual features against the facial imagery data to authenticate the one or more users in real time.

In the next step, the computer-implemented method includes providing, by the one or more hardware processors through an access control subsystem, controlled access to one or more in-platform applications subsequent to authentication of the one or more users to perform the one or more user-specified tasks. The one or more in-platform applications comprise at least one of: a time management application, a communication application, a project management application, a customer relationship management (CRM) application, a document management application, a talent acquisition application, a content publishing application, a marketing application, a financial operations application, and a user analytics application.

The time management application is configured for coordinating at least one of: meetings, events, and availability. The communication application is configured for real-time voice and text communication, announcements, notifications, webinars, presentations, and virtual meetings. The project management application is configured for at least one of: creating tasks, assigning tasks, updating tasks, and tracking at least one of: tasks, milestones, deadlines, and resource allocations across a plurality of teams. The CRM application is configured for at least one of: managing customer profiles, tracking sales pipelines, recording communication history, organizing support tickets, and facilitating lead conversion. The document management application is configured for at least one of: uploading, storing, sharing, editing, and electronically executing corporate documents and files within the multi-functional framework. The talent acquisition application is configured for publishing employment opportunities and conducting interviews. The content publishing application is configured for uploading and publishing at least one of: user-generated videos, blogs, reviews, endorsements, hosting webinars, promotional video contents, multimedia campaigns. The marketing application is configured for at least one of: listing products and services, bidding on products and services, purchasing products, and selling services. The financial operations application is configured for managing at least one of: payments, invoicing, financial transactions, accounting, ledger management, financial reporting, tax computation and compliance, general journal entries, bank reconciliation, and depreciation tracking. The user analytics application is configured for at least one: tracking performance, engagement metrics, and activity history.

In the next step, the computer-implemented method includes integrating, by the one or more hardware processors through an application programming interface (API) subsystem, at least one of: one or more third-party applications and one or more third-party tools into the multi-functional framework based on a user preference to perform the one or more user-specified tasks. Integrating at least one of: the one or more third-party applications and the one or more third-party tools, comprises: i) obtaining one or more API keys and one or more authentication tokens associated with at least one of: the one or more third-party applications and the one or more third-party tools from extensible application ecosystem, the one or more API keys and the one or more authentication tokens generated in the extensible application ecosystem associated with at least one of: the one or more third-party applications and the one or more third-party tools, ii) installing one of: one or more additional libraries and one or more platform-specific building tools to interact with the multi-functional framework using a hypertext preprocessor (PHP) procedure, iii) initiating API calls using the PHP procedure to the extensible application ecosystem, iv) receiving API responses for the initiated API calls, from the extensible application ecosystem in a structured data format including at least one of: JavaScript Object Notation (JSON) and Extensible Markup Language (XML), and v) parsing the API responses to extract relevant task-related data to perform the one or more user-specified tasks. At least one of: the one or more third-party applications and the one or more third-party tools comprise at least one of: accounting applications, project management tools, customer relationship management tools, payment gateways, communication tools, cloud storage service tools, social media platforms, document management tools, webinar hosting platforms, and video marketing platforms.

In the next step, the computer-implemented method includes executing, by the one or more hardware processors through an artificial intelligence (AI) automation subsystem, the one or more user-specified tasks in at least one of: the one or more in-platform applications, the one or more third-party applications, and the one or more third-party tools.

In the next step, the computer-implemented method includes tracking, by the one or more hardware processors through a blockchain activity logging subsystem, financial transactions and the one or more user-specified tasks across the multi-functional framework to provide blockchain-based crypto tokens.

In the next step, the computer-implemented method includes utilizing, by the one or more hardware processors through the blockchain activity logging subsystem, the provided blockchain-based crypto tokens for at least one of: accessing platform services, buying products and services, and exchanging the provided blockchain-based crypto tokens within the multi-functional framework.

In accordance with another embodiment of the present disclosure, a computer-implemented system for providing the multi-functional framework to perform the one or more user-specified tasks is disclosed. The computer-implemented system comprises one or more servers. The one or more servers configured with the one or more hardware processors and a memory unit. The memory unit operatively connected to the one or more hardware processors, wherein the memory unit comprises a set of computer-readable instructions in form of a plurality of subsystems, configured to be executed by the one or more hardware processors. The plurality of subsystems comprises the user profile generating subsystem, the data obtaining subsystem, the authentication subsystem, the access control subsystem, the API subsystem, the AI automation subsystem, and the blockchain activity logging subsystem.

In an embodiment, the user profile generating subsystem is configured to generate the user profile for each user of the one or more users to provide access to the multi-functional framework.

In yet another embodiment, the data obtaining subsystem is configured to obtain at least one of: the structured metadata and the unstructured metadata from the one or more users associated with the user profile.

In yet another embodiment, the authentication subsystem is configured to authenticate the one or more users based on at least one of: the facial imagery data, the structured metadata, the unstructured metadata, the government-issued identification documents, the video-based character references, and the financial account verification data, the prior to granting access to the multi-functional platform.

In yet another embodiment, the access control subsystem is configured to provide controlled access to the one or more in-platform applications subsequent to authentication of the one or more users for performing the one or more user-specified tasks.

In yet another embodiment, the API subsystem is configured to integrate at least one of: the one or more third-party applications and the one or more third-party tools into the multi-functional framework based on the user preference to perform the one or more user-specified tasks. The API subsystem is configured to obtain the one or more API keys and the one or more authentication tokens associated with at least one of: the one or more third-party applications and the one or more third-party tools from the extensible application ecosystem. The one or more API keys and the one or more authentication tokens generated in the extensible application ecosystem associated with at least one of: the one or more third-party applications and the one or more third-party tools. The API subsystem is configured to install one of: the one or more additional libraries and the one or more platform-specific building tools to interact with the multi-functional framework using the PHP procedure. The API subsystem is configured to initiate API calls using the PHP procedure to the extensible application ecosystem. The API subsystem is configured to receive API responses for the initiated API calls from the extensible application ecosystem in a structured data format, including at least one of: JSON and XML. The API subsystem is configured to parse the API response to extract relevant task-related data to perform the one or more user-specified tasks.

In yet another embodiment, the artificial intelligence (AI) automation subsystem is configured to execute the one or more user-specified tasks in at least one of: the one or more in-platform applications, the one or more third-party applications, and the one or more third-party tools.

In yet another embodiment, the blockchain activity logging subsystem is configured to track the financial transactions and the one or more user-specified tasks across the multi-functional framework to provide the blockchain-based crypto tokens. The blockchain activity logging subsystem is configured to utilize the provided blockchain-based crypto tokens for at least one of: accessing platform services, buying products and services, and exchanging the provided blockchain-based crypto tokens within the multi-functional framework.

In accordance with another embodiment of the present disclosure, a non-transitory computer-readable storage medium storing computer-executable instructions that, when executed by the one or more hardware processors, cause the one or more hardware processors to perform operations for providing the multi-functional framework to perform the one or more user-specified tasks. The operations comprising: a) generating the user profile for each user of the one or more users to provide access to the multi-functional framework, b) obtaining at least one of: the structured metadata and the unstructured metadata from the one or more users associated with the user profile, c) authenticating the one or more users based on at least one of: the facial imagery data, the structured metadata, the unstructured metadata, the government-issued identification documents, the video-based character references, and the financial account verification data, prior to granting access to the multi-functional platform, d) providing controlled access to the one or more in-platform applications subsequent to authentication of the one or more users to perform the one or more user-specified tasks, and e) integrating at least one of: the one or more third-party applications and the one or more third-party tools into the multi-functional framework based on the user preference to perform the one or more user-specified tasks.

wherein integrating at least one of: the one or more third-party applications and the one or more third-party tools, comprises: a) obtaining the one or more API keys and the one or more authentication tokens associated with at least one of: the one or more third-party applications and the one or more third-party tools from extensible application ecosystem, the one or more API keys and the one or more authentication tokens generated in the extensible application ecosystem associated with at least one of: the one or more third-party applications and the one or more third-party tools, b) installing one of: the one or more additional libraries and the one or more platform-specific building tools to interact with the multi-functional framework using the PHP procedure, c) initiating API calls using the PHP procedure to the extensible application ecosystem, d) receiving API responses for the initiated API calls, from the extensible application ecosystem in the structured data format including at least one of: JSON and XML, and e) parsing the API responses to extract relevant task-related data to perform the one or more user-specified tasks.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limited in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
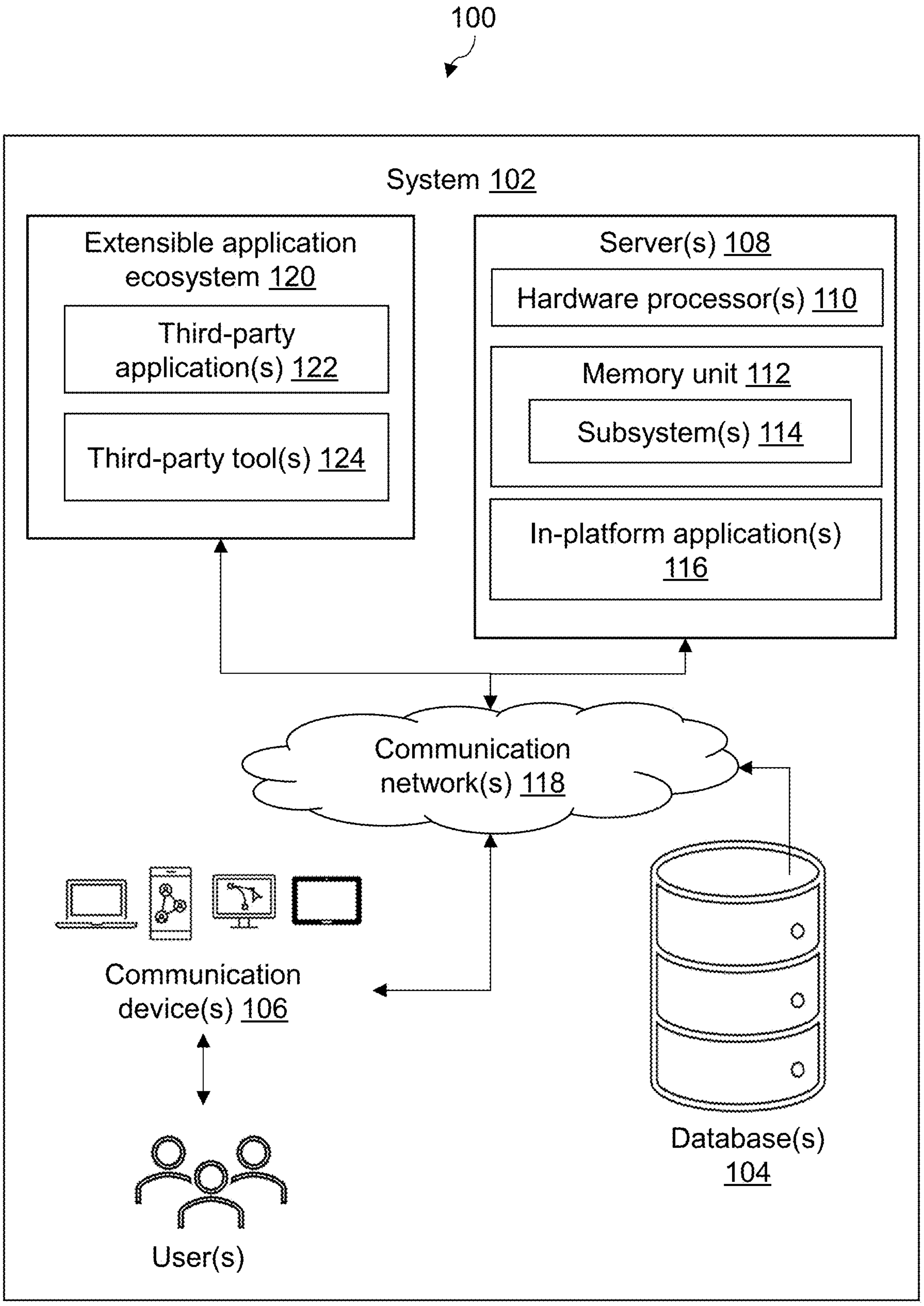
FIG. 1 illustrates an exemplary block diagram representation of a network architecture depicting a computer-implemented system for providing a multi-functional framework to perform one or more user-specified tasks, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 depicting a computer-implemented system 102 for providing a multi-functional framework to perform one or more user-specified tasks, in accordance with an embodiment of the present disclosure.

According to an exemplary embodiment of the present disclosure, FIG. 1 depicts the network architecture 100 that may include the computer-implemented system 102, one or more databases 104, and one or more communication devices 106. The computer-implemented system 102, the one or more databases 104, and the one or more communication devices 106 may be communicatively coupled via one or more communication networks 118, ensuring seamless data transmission, processing, and performing the one or more user-specified tasks. The computer-implemented system 102 enables one or more users to interact with a centralized platform that integrates multiple functional components, including one or more in-platform applications 116, one or more third-party applications 122, one or more third-party tools 124, artificial intelligence-driven automation, and blockchain-based tracking for secure and intelligent business task execution.

In an exemplary embodiment, the computer-implemented system 102 includes one or more servers 108, which form the computational core of the platform. The one or more servers 108 comprises one or more hardware processors 110 and a memory unit 112. The memory unit 112 is operatively connected to the one or more hardware processors 110. The memory unit 112 may be a non-transitory computer-readable storage medium storing executable instructions and data. The memory unit 112 comprises a set of computer-readable instructions in form of the plurality of subsystems 114, configured to be executed by the one or more hardware processors 110, each responsible for a specific function within the platform, such as authentication, access control, API integration, AI automation, or blockchain activity tracking. Additionally, the one or more servers 108 are configured to execute and manage the one or more in-platform applications 116 that are natively built into the computer-implemented system 102 to support core business functionalities such as project management, scheduling, content publishing, document handling, accounting, and analytics.

The one or more hardware processors 110 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or the one or more hardware processors 110.

In an exemplary embodiment, the one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 are configured to execute computer-readable instructions for performing various operations such as user profile generation, data acquisition, authentication, access management, and task execution. Any reference to one or more user-specified tasks in the present disclosure may refer to an operation or that may be performed on at least one of, but not limited to, document management, project management, social media management, financial management, accounting management activities, scheduling meetings, initiating communication, webinar hosting, video marketing, talent acquisition activities, consumer transaction services, and the like.

The one or more hardware processors 110 are high-performance processors capable of handling large volumes of structured data related to the multi-functional framework to perform the one or more user-specified tasks. The one or more hardware processors 110 may be, but not limited to, at least one of: multi-core central processing units (CPU), a graphics processing unit (GPU)-based processing unit, and the like that enhance an ability of the computer-implemented system 102 to perform at least one of: a document management application, a project management application, a customer relationship management tool, a financial operations application, a scheduling and calendar module, a communication platform, a talent acquisition system, a content publishing module, a marketing or video marketing application, a social media management tool, a webinar hosting platform, or any other in-platform or integrated third-party application that facilitates business or operational workflows within the multi-functional framework.

In an exemplary embodiment, the one or more databases 104 may be configured to store and manage data related to various aspects of the computer-implemented system 102. The one or more databases 104 may store at least one of, but not limited to, structured metadata and unstructured metadata, user profiles, authentication logs, financial records, documents, task data, token-based activity tracking, and the like. The one or more databases 104 serve as a centralized repository for critical data elements that are integral to the secure operation of the computer-implemented system 102, enabling efficient management and synchronization of data associated with the computer-implemented system 102. The one or more databases 104 enable the computer-implemented system 102 to dynamically retrieve, analyze, and update the stored data in real-time, for providing the multi-functional framework to perform the one or more user-specified tasks. The one or more databases 104 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch database, object storage systems, lender criteria database, and the like. The one or more databases 104 are queried and updated by the one or more servers 108 in real time as the one or more users interact with the computer-implemented system 102 or as one or more AI bots execute user-defined tasks. The one or more databases 104 also store data essential for the issuance and redemption of blockchain-based tokens, ensuring a secure and tamper-evident ledger of the computer-implemented system 102 interactions.

In an exemplary embodiment, the one or more communication devices 106 are configured to enable the one or more users to interact with the computer-implemented system 102. The one or more communication devices 106 may be digital devices, computing devices, and/or networks. The one or more communication devices 106 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like. The one or more communication devices 106 are configured with a user interface, which is configured to enable seamless interaction between the one or more users and the computer-implemented system 102. The user interface may include the graphical user interface (GUI) units, voice-based interfaces, and touch-based interfaces, depending on the capabilities of the computer-implemented system 102 being used. The GUI units may be configured to display outputs, including, but not restricted to, at least one of: design outcomes, simulation results, and prediction results to the one or more users. The one or more communication devices 106 may also support multimodal inputs, allowing the one or more users to interact through voice commands, text inputs, and gesture-based controls, ensuring accessibility and ease of use across different user demographics. The one or more communication devices 106 are configured to securely transmit and receive data to and from the computer-implemented system 102 via the one or more communication networks 118, ensuring seamless user experience and real-time synchronization.

In an exemplary embodiment, the one or more communication networks 118 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee®, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the computer-implemented system 102 may be implemented by way of a single device or a combination of multiple devices that may be operatively connected or networked together. The computer-implemented system 102 may be implemented in hardware or a suitable combination of hardware and software. The computer-implemented system 102 is communicatively connected to an extensible application ecosystem 120, which facilitates the integration of the one or more third-party applications 122 and the one or more third-party tools 124. These external services may include accounting systems, project management platforms, CRM tools, cloud storage services, communication tools, social media platforms, webinar hosting solutions, and video marketing tools. The integration between computer-implemented system 102 and the extensible application ecosystem 120 is managed via a dedicated application programming interface (API) subsystem, which handles tasks such as generating API keys, obtaining authentication tokens, issuing API calls, and parsing responses using technologies like Hypertext Preprocessor (PHP). This allows seamless interoperability between in-platform functionalities and externally hosted services, driven by user preferences and operational requirements.

Though few components and the plurality of subsystems 114 are disclosed in FIG. 1, there may be additional components and subsystems which is not shown, such as, but not limited to, ports, routers, repeaters, firewall devices, network devices, the one or more databases 104, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the computer-implemented system 102, and the one or more communication devices 106 connected to the one or more databases 104, one skilled in the art may envision that the computer-implemented system 102, and the one or more communication devices 106 may be connected to several user devices located at various locations and several databases via the one or more communication networks 118.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the computer-implemented system 102 as is unique to the present disclosure or necessary for an understanding of the present disclosure is depicted and described. The remainder of the construction and operation of the computer-implemented system 102 may conform to any of the various current implementations and practices that are known in the art.

Figure 2:
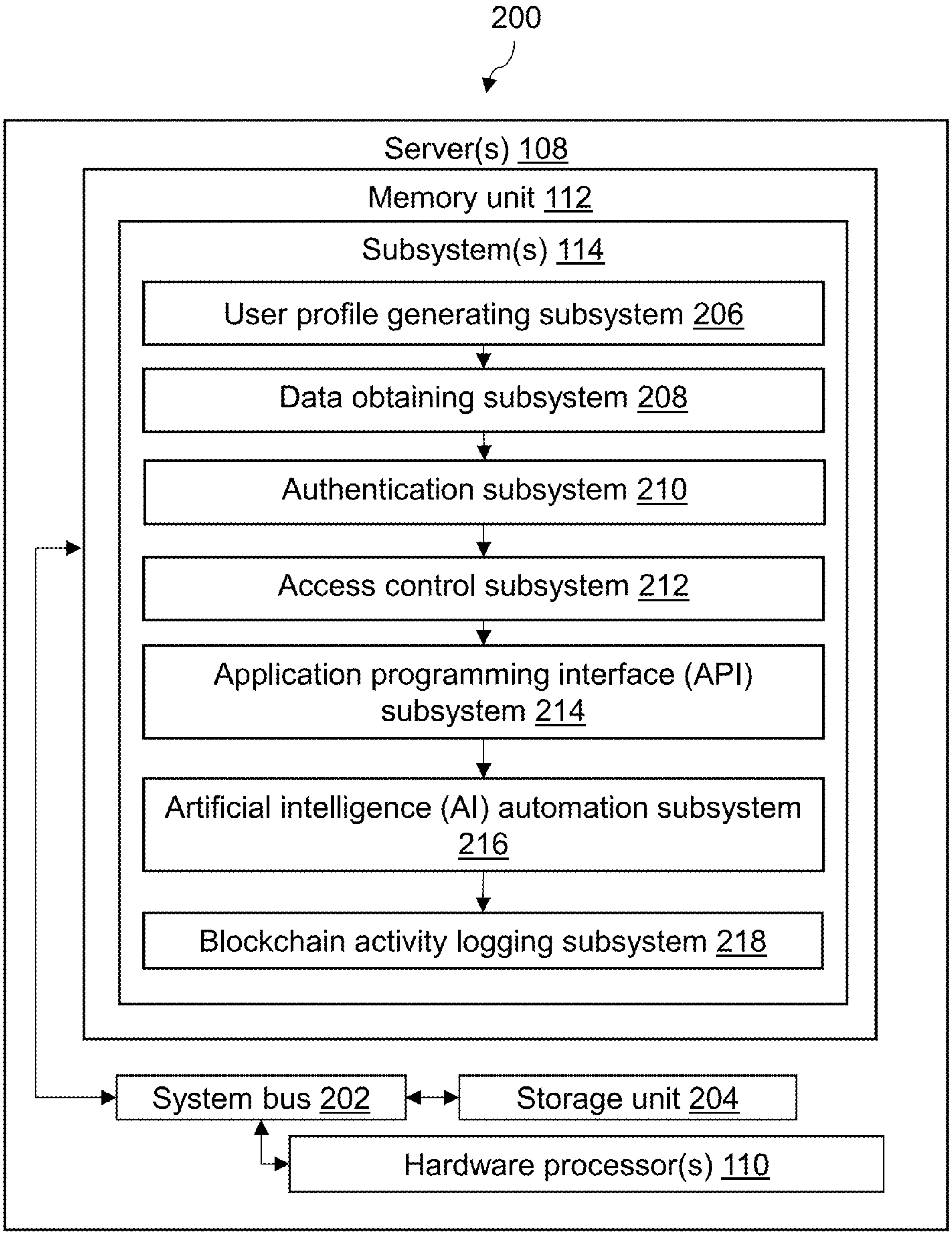
FIG. 2 illustrates an exemplary block diagram representation of the computer-implemented system as shown in FIG. 1 for providing the multi-functional framework to perform the one or more user-specified tasks, in accordance with an embodiment of the present disclosure.

FIG. 2 illustrates an exemplary block diagram 200 representation of the computer-implemented system 102 as shown in FIG. 1 for providing the multi-functional framework to perform the one or more user-specified tasks, in accordance with an embodiment of the present disclosure.

In an exemplary embodiment, the computer-implemented system 102 (hereinafter referred to as the system 102) comprises the one or more hardware processors 110, the memory unit 112, and a storage unit 204. The one or more hardware processors 110, the memory unit 112, and the storage unit 204 are communicatively coupled through a system bus 202 or any similar mechanism. The system bus 202 functions as the central conduit for data transfer and communication between the one or more hardware processors 110, the memory unit 112, and the storage unit 204. The system bus 202 facilitates the efficient exchange of information and instructions, enabling the coordinated operation of the system 102. The system bus 202 may be implemented using various technologies including, but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 112 is operatively connected to the one or more hardware processors 110. The memory unit 112 comprises the plurality of subsystems 114 in the form of programmable instructions executable by the one or more hardware processors 110. The plurality of subsystems 114 comprises a user profile generating subsystem 206, a data obtaining subsystem 208, an authentication subsystem 210, an access control subsystem 212, an application programming interface (API) subsystem 214, an artificial intelligence (AI) automation subsystem 216, and a blockchain activity logging subsystem 218. The one or more hardware processors 110 associated within the one or more servers 108, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory unit 112 may be the non-transitory volatile memory and the non-volatile memory. The memory unit 112 may be connected to communicate with the one or more hardware processors 110 and may serve as a computer-readable storage medium. The one or more hardware processors 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as a read-only memory (ROM), a random-access memory (RAM), erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more hardware processors 110.

The storage unit 204 may be a cloud storage or the one or more databases 104 such as those shown in FIG. 1. The storage unit 204 is configured to store various forms of persistent data used by the system 102. This includes, but is not limited to, user profiles, the structured metadata and the unstructured metadata, the authentication logs, platform usage history, API transaction logs, and blockchain ledger entries related to activity tracking and crypto token issuance. In some embodiments, the storage unit 204 also stores recommended course-of-action sequences dynamically generated by the system 102. These action sequences are based on at least one of, but not limited to: user interaction patterns tracked by the blockchain activity logging subsystem 218, business rules derived from the integrated one or more third-party applications 122 and the one or more third-party tools 124, historical platform usage data, preferences stored within the user profile generating subsystem 206, decision models derived from the AI automation subsystem 216, and workflow triggers initiated via the API subsystem 214. Additionally, the storage unit 204 may retain previous action sequences for comparison and future reference, enabling continuous refinement of the system 102 over time. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the user profile generating subsystem 206 is configured to generate the user profile for each user of the one or more users to provide secure and personalized access to the multi-functional framework. The profile generation process is initiated upon user registration or system onboarding, during which the user profile generating subsystem 206 collects a combination of explicit user inputs (e.g., name, email, organization, role) and implicit behavioral metadata (e.g., device identifiers, usage patterns, geolocation data, and platform interaction history). These data points are aggregated and stored in a structured format using a relational or NoSQL database, depending on the scalability and query complexity requirements of the system 102. Each user profile is assigned a unique identifier (UID) that serves as a primary key across the user profile generating subsystem 206, enabling seamless association of the one or more users with services such as CRM, educational modules, financial tools, and collaboration workspaces. Role-based access control (RBAC) policies are then applied, leveraging the profile data to dynamically assign permissions and access scopes across different application modules.

In an exemplary embodiment, the data obtaining subsystem 208 is configured to obtain at least one of: the structured metadata and the unstructured metadata from the one or more users associated with the user profile. The data obtaining subsystem 208 functions as an integral component within the multi-functional framework, interfacing directly with the user profile generating subsystem 206, storage infrastructure, and downstream application services that rely on both static and dynamic user data for execution.

The structured metadata comprises, but not limited to, at least one of: personal identification data (such as but not limited to at least one of: name, date of birth, nationality, government-issued identification numbers), professional information (such as, but not limited to, at least one of: job titles, employment history, organizational affiliations, and the like), educational information (including, but not limited to, at least one of: academic qualifications, institutions attended, degrees obtained), professional licenses and certifications (such as but not limited to at least one of: industry-recognized credentials, license numbers, issuing bodies, expiration dates, and the like), social and online presence data (including but not limited to at least one of: uniform resource locators (URLs) to social media profiles, professional networking accounts, web portfolios, and the like), skill attributes (explicitly stated and endorsed proficiencies, such as, but not limited to, at least one of: technical, soft, domain-specific skills, and the like), publication details (such as, but not limited to, at least one of: authored papers, articles, patents, relevant intellectual contributions, and the like), geolocation data (captured through the one or more communication devices 106 or user-submitted information), and the like.

The data obtaining subsystem 208 is configured to collect structured metadata through multiple interfaces such as web-based forms, authenticated APIs, file uploads (e.g., resumes, license scans), and integrations with third-party services (e.g., at least one of: LinkedIn®, academic verification providers, and credentialing platforms). Upon capture, the data is parsed, normalized, and mapped into predefined schema structures to ensure compatibility and consistency across the system 102.

In parallel, the unstructured metadata comprises, but not limited to, at least one of: user-generated content, video recordings, image and media uploads, voice inputs, behavioral logs, and the like. The user-generated content includes, but not limited to, at least one of: comments, forum discussions, text entries, collaborative documents, and the like. The video recordings include, but not limited to, at least one of: uploaded and recorded through in-platform conferencing and learning tools, and the like. The image and media uploads, such as, but not limited to, at least one of: profile pictures, scanned documents, graphical work samples, and the like. The voice inputs include, but not limited to, at least one of: captured through speech interfaces and transcribed meeting audio. The behavioral logs include, but not limited to, at least one of: clickstream data, session durations, navigation patterns, interaction history, and the like. The data obtaining subsystem 208 employs real-time event listeners, data ingestion pipelines, and content extraction mechanisms to capture unstructured metadata. In another exemplary embodiment, advanced processing components, such as natural language processing (NLP) engines, audio-to-text transcription models, and image recognition modules, may be applied to convert or enrich unstructured data, thereby enhancing its utility within the system 102. In a preferred implementation, the data obtaining subsystem 208 includes security mechanisms such as encryption-at-rest and encryption-in-transit to protect sensitive data. Additionally, user consent management protocols ensure that data collection complies with regulatory requirements, including, but not limited to, at least one of: General Data Protection Regulation (GDPR), Health Insurance Portability and Accountability Act (HIPAA), and Central Consumer Protection Authority (CCPA), as applicable.

Through the acquisition and categorization of both the structured metadata and the unstructured metadata, the data obtaining subsystem 208 enables downstream subsystems to perform context-aware operations, such as personalized content delivery, intelligent search, analytics, compliance verification, and recommendation generation, thereby contributing to the dynamic functionality of the multi-functional framework. The multi-functional framework refers to the entire integrated digital environment or platform that hosts and interconnects the one or more in-platform applications 116 and at least one of: the one or more third-party applications 122 and the one or more third-party tools 124 for performing the one or more user-specified tasks.

In an exemplary embodiment, the authentication subsystem 210 configured to authenticate the one or more users prior to granting access to the multi-functional platform. The authentication process is executed based on based on at least one of, but not limited to, facial imagery data, the structured metadata, the unstructured metadata, the government-issued identification documents, video-based character references, financial account verification data, and the like. The authentication subsystem 210 is implemented as a secure, real-time verification service within the system 102, interfacing with both frontend input sources and backend validation engines.

The authentication subsystem 210 incorporates multiple layers of identity validation by analyzing at least one of: biometric data points and non-biometric data points. Initially, the authentication subsystem 210 is configured to receive facial imagery data from a real-time video stream, captured through the one or more communication devices 106 (e.g., smartphone camera, webcam, or biometric kiosk). The authentication subsystem 210 performs facial recognition combined with liveness detection techniques. The liveness detection techniques may include, but not limited to, at least one of: eye-blink detection, head movement tracking, and texture analysis to distinguish between live users and spoofing attempts such as static images or deepfakes.

Concurrently, the authentication subsystem 210 is configured to process government-issued identification documents submitted by each user. This includes documents such as, but not limited to, one of: passports, driver's licenses, national identity cards, and equivalent. The authentication subsystem 210 is configured to extract relevant identity details from these government-issued identification documents by applying optical character recognition (OCR) procedures to parse textual features, and by leveraging image analysis techniques (such as keypoint detection and pattern recognition) to extract visual features, including holograms, document layout, or embedded photographs.

Following feature extraction, the authentication subsystem 210 is configured to perform a mapping operation, wherein at least one of the textual features and the visual features extracted from the government-issued identification documents are cross-validated against the live facial imagery data collected in real time. This step ensures biometric correlation between the submitted identity document and the live subject. The mapping process may include facial feature vector comparison, image hash matching, and metadata consistency checks.

Additionally, the authentication subsystem 210 may verify supporting user attributes such as the structured metadata and the unstructured metadata collected from the data obtaining subsystem 208, including but not limited to name, date of birth, educational background, user-generated content patterns, and geolocation data. These data elements are evaluated for consistency with those found in the user's submitted credentials and behavioral history. To provide an additional layer of trustworthiness, the authentication subsystem 210 may also incorporate video-based character references, wherein a pre-authorized individual submits a recorded or live-streamed reference video. The content of such videos may be processed using the natural language processing (NLP) techniques to extract semantic meaning, speaker verification, and authenticity signals.

Furthermore, the financial account verification data may be retrieved and analyzed through third-party integrations (e.g., Plaid® or banking APIs) to confirm the identity of the user via linked financial instruments or transaction histories, particularly for use cases that require regulatory compliance or financial risk mitigation. Collectively, these processes enable the authentication subsystem 210 to perform robust, multi-factor authentication, combining biometric, document-based, behavioral, and relational identity verification methods.

In an exemplary embodiment, the access control subsystem 212 is configured to provide controlled access to one or more in-platform applications 116 subsequent to authentication of the one or more users. The authentication is performed by the authentication subsystem 210, ensuring that only verified and legitimate users are granted access. Upon successful authentication, the access control subsystem 212 dynamically evaluates and assigns permissions, based on predefined rules, user roles, user preferences, and contextual metadata associated with the user profile. The access control subsystem 212 utilizes a role-based access control (RBAC) model, attribute-based access control (ABAC), or a hybrid of both, to ensure that each authenticated user is granted access only to those one or more in-platform applications 116 and functionalities necessary to perform their designated or self-assigned operations, referred to herein as user-specified tasks.

The one or more user-specified tasks comprise, but not limited to, at least one of: document management (e.g., uploading, storing, categorizing, and retrieving files), project management (e.g., task assignment, deadline tracking, progress monitoring), social media management (e.g., scheduling posts, tracking engagement, responding to comments), financial management (e.g., budget planning, invoicing, transaction monitoring), accounting management activities (e.g., bookkeeping, ledger maintenance, tax-related calculations), scheduling meetings (e.g., calendar integration, availability tracking, automated reminders), initiating communication (e.g., launching chat sessions, sending emails, initiating VoIP or video calls), webinar hosting (e.g., scheduling, launching, and moderating live webinars), video marketing (e.g., creating, editing, and distributing promotional video content), talent acquisition activities (e.g., posting job roles, reviewing applicants, conducting interviews), consumer transaction services (e.g., enabling product or service purchases, payment gateway integration, and receipt generation), and the like. To support these tasks, the access control subsystem 212 interacts with and regulates access to the one or more in-platform applications 116, which comprise, but are not limited to, at least one of: a time management application, a communication application, a project management application, a customer relationship management (CRM) application, a document management application, a talent acquisition application, a content publishing application, a marketing application, a financial operations application, a user analytics application, and the like.

The time management application is configured for coordinating at least one of: meetings, events, and availability. The communication application is configured for real-time voice and text communication, announcements, notifications, webinars, presentations, and virtual meetings. The project management application is configured for at least one of: creating tasks, assigning tasks, updating tasks, and tracking at least one of: tasks, milestones, deadlines, and resource allocations across a plurality of teams. The CRM application is configured for at least one of: managing customer profiles, tracking sales pipelines, recording communication history, organizing support tickets, and facilitating lead conversion. The document management application is configured for at least one of: uploading, storing, sharing, editing, and electronically executing corporate documents and files within the multi-functional framework. The talent acquisition application is configured for publishing employment opportunities and conducting interviews. The content publishing application is configured for uploading and publishing at least one of: user-generated videos, blogs, reviews, endorsements, hosting webinars, promotional video contents, multimedia campaigns. The marketing application is configured for at least one of: listing products and services, bidding on products and services, purchasing products, and selling services. The financial operations application is configured for managing at least one of: payments, invoicing, financial transactions, accounting, ledger management, financial reporting, tax computation and compliance, general journal entries, bank reconciliation, and depreciation tracking. The user analytics application is configured for at least one: tracking performance, engagement metrics, and activity history.

The access control subsystem 212 ensures that user access to each of the in-platform applications 116 of the one or more in-platform applications 116 is dynamically governed by real-time contextual signals such as login time, device information, user geolocation, and historical usage patterns. Furthermore, the access control subsystem 212 is capable of issuing temporary access tokens or session-based permissions using security protocols such as OAuth 2.0 or JSON Web Tokens (JWT), thereby maintaining a secure access environment while supporting scalable, multi-user collaboration. In addition, the access control subsystem 212 supports s administrative functionalities, allowing system administrators or organizational leaders to define custom permission sets, audit user activity logs, and enforce compliance policies across the multi-functional platform.

In an exemplary embodiment, the API subsystem 214 is configured to integrate at least one of: one or more third-party applications 122 and one or more third-party tools 124 into the multi-functional framework based on a user preference to perform the one or more user-specified tasks. The API subsystem 214 is configured to operate as an extensibility layer within the system 102, enabling dynamic interoperability between the platform's native services and external ecosystems. This integration empowers users to extend platform functionality without leaving the core environment.

Integrating at least one of: the one or more third-party applications 122 and the one or more third-party tools 124, comprises a multi-step technical process, outlined as follows:

i) The API subsystem 214 is configured to obtain one or more API keys and one or more authentication tokens associated with at least one of: the one or more third-party applications 122 and the one or more third-party tools 124 from the extensible application ecosystem 120. These API keys and authentication tokens are generated within the extensible application ecosystem 120, which may include but not limited to commercial software marketplaces, developer portals, cloud service platforms, or software-as-a-service (SaaS) environments. The API subsystem 214 is configured to manage secure storage and lifecycle management (e.g., refresh or revocation) of these credentials to maintain persistent and authorized access.

ii) The API subsystem 214 is configured to proceed to install one of: one or more additional libraries and one or more platform-specific building tools that are required to enable interaction between the external service and the multi-functional framework. The one or more additional libraries and the one or more platform-specific building tools are invoked or linked using a hypertext preprocessor (PHP) procedure, which acts as the server-side logic handler responsible for making outbound calls, managing session states, and processing response payloads in real time. Platform-specific dependencies may include Software Development Kits (SDKs), authentication modules, and/or data transformation utilities specific to the external application being integrated.

iii) The API subsystem 214 then initiates API calls using the aforementioned PHP procedure to the extensible application ecosystem 120. These API calls may include Hypertext Transfer Protocol (HTTP) GET, HTTP POST, HTTP PUT, or HTTP DELETE methods, depending on the nature of the third-party endpoint and the desired operation. For example, a POST request may be initiated to submit form data to a project management tool, while a GET request may be used to retrieve transaction logs from a payment gateway.

iv) Upon initiating API calls, the API subsystem 214 is configured to receive API responses from the extensible application ecosystem 120 in a structured data format, including at least one of: JavaScript Object Notation (JSON) and Extensible Markup Language (XML). These data formats are selected for their interoperability, machine-readability, and compatibility with existing parsers and frameworks used within the system 102. The structured responses may contain task-specific data such as user profiles, financial records, content items, or engagement metrics, depending on the type of integration.

v) The API subsystem 214 is further configured to parse the API responses to extract relevant task-related data. Parsing involves validating the structure of the received payload, extracting the necessary fields using data extraction libraries or regular expressions, and converting the data into internal formats that can be consumed by other subsystems within the multi-functional framework. This parsed data is then routed to the appropriate modules for executing the user-specified tasks, such as generating invoices, posting content, scheduling meetings, or updating project statuses.

At least one of: the one or more third-party applications 122 and the one or more third-party tools 124 comprise, but not limited to, at least one of: accounting applications (e.g., QuickBooks®, Xero®), project management tools (e.g., Trello®, Asana®), customer relationship management tools (e.g., Salesforce®, Zoho CRM®), payment gateways (e.g., Stripe®, PayPal®), communication tools (e.g., Slack®, Microsoft Teams®), cloud storage service tools (e.g., Google Drive® Dropbox®), social media platforms (e.g., LinkedIn®, Facebook®), document management tools (e.g., DocuSign®, PandaDoc®), webinar hosting platforms (e.g., Zoom®, GoToWebinar®), video marketing platforms (e.g., YouTube®, Vimeo®), and the like.

In an exemplary embodiment, the AI automation subsystem 216 is configured to execute the one or more user-specified tasks in at least one of: the one or more in-platform applications 116, the one or more third-party applications 122, and the one or more third-party tools 124. The AI automation subsystem 216 operates by first receiving one or more user-specified tasks, which may be input by the one or more users through at least one of: the user interface and an AI chatbot or inferred from the user's interaction history, behavioral patterns, or system-generated triggers. The one or more user-specified tasks may relate to functional activities such as scheduling calendar events, posting content to social media, generating invoices in a financial tool, initiating communication via messaging platforms, updating task progress in a project management system, or organizing files in a cloud-based document management application.

Once the one or more user-specified tasks are identified, the AI automation subsystem 216 (the AI chatbot) dynamically determines the appropriate context and execution pathway based on metadata previously obtained by the data obtaining subsystem 208 and stored in the storage unit 204. The AI automation subsystem 216 may utilize rule-based logic, decision trees, machine learning models, or a combination thereof to map user-specified tasks to corresponding actions within the applicable one or more in-platform applications 116, the one or more third-party applications 122, or one or more third-party tools 124.

For example, in the context of a financial task, the AI automation subsystem 216 may interface with the API subsystem 214 to retrieve account data from a third-party accounting application, generate an invoice using predefined templates, auto-fill the required fields from the user profile, and submit the invoice for approval or dispatch. Similarly, for a content-related task, the AI automation subsystem 216 may generate a post, attach multimedia assets, and publish the content across multiple connected social media platforms, based on scheduling preferences configured within the user profile.

The AI automation subsystem 216 also includes task queue management and monitoring logic. The AI automation subsystem 216 is configured to track the status of each task, whether pending, in-progress, completed, or failed, and logs this status to the blockchain activity logging subsystem 218 for auditability and token-based reward eligibility. In some embodiments, the AI automation subsystem 216 may further use the NLP techniques to interpret voice or text-based instructions and convert them into structured task commands.

Moreover, the AI automation subsystem 216 may leverage feedback loops and performance metrics to refine the NLP techniques over time, adapting to user behavior and improving the efficiency and accuracy of task execution. The AI automation subsystem 216 may be continuously trained using anonymized usage data to support context-aware decision-making and personalization of task flows.

In an exemplary embodiment, the blockchain activity logging subsystem 218 is configured to track financial transactions and the one or more user-specified tasks across the multi-functional framework to provide blockchain-based crypto tokens. The blockchain activity logging subsystem 218 serves as an immutable, tamper-evident audit trail mechanism that enables real-time monitoring, verification, and rewarding of user activity within the system 102. The blockchain activity logging subsystem 218 is configured to monitor and record a wide range of user actions performed within the system 102, including but not limited to: execution of the one or more user-specified tasks, completion of actions within the one or more in-platform applications 116, and utilization of services integrated through the one or more third-party applications 122 and the one or more third-party tools 124 via the API subsystem 214. Each logged activity is hashed and timestamped and may be digitally signed using cryptographic methods to ensure verifiability and to prevent unauthorized modification.

The blockchain activity logging subsystem 218 interacts with a blockchain network, either public, private, or consortium-based, by creating transaction entries that represent platform actions. These transaction entries may include metadata such as user identifier (anonymized or encrypted), task category, completion time, and system-defined weight or value associated with the task. Upon successful recording of such activities, the blockchain activity logging subsystem 218 calculates and issues a corresponding amount of blockchain-based crypto tokens to the user's digital wallet or internal platform token ledger, based on predefined rules stored in the system 102 or encoded in smart contracts deployed on the blockchain.

In some embodiments, the blockchain-based crypto tokens are utility tokens that function as incentives within the multi-functional framework. The blockchain activity logging subsystem 218 is further configured to utilize the provided blockchain-based crypto tokens for at least one of: accessing platform services, buying products and services, and exchanging the provided blockchain-based crypto tokens within the multi-functional framework. Specifically, users may redeem tokens to unlock premium features, purchase goods or services listed on the platform marketplace, or transfer tokens to other users or verified vendor accounts. The subsystem ensures that token balances and transactions are updated in real-time and recorded immutably on the blockchain ledger.

Moreover, the blockchain activity logging subsystem 218 enforces smart contract-based logic to govern token circulation, validity, and redemption rules, enabling secure automation of reward distribution, transaction approval, and access validation. To support interoperability and wallet security, the subsystem may interface with industry-standard protocols such as ERC-20 (Ethereum) or equivalent blockchain frameworks, depending on implementation.

Figure 3:
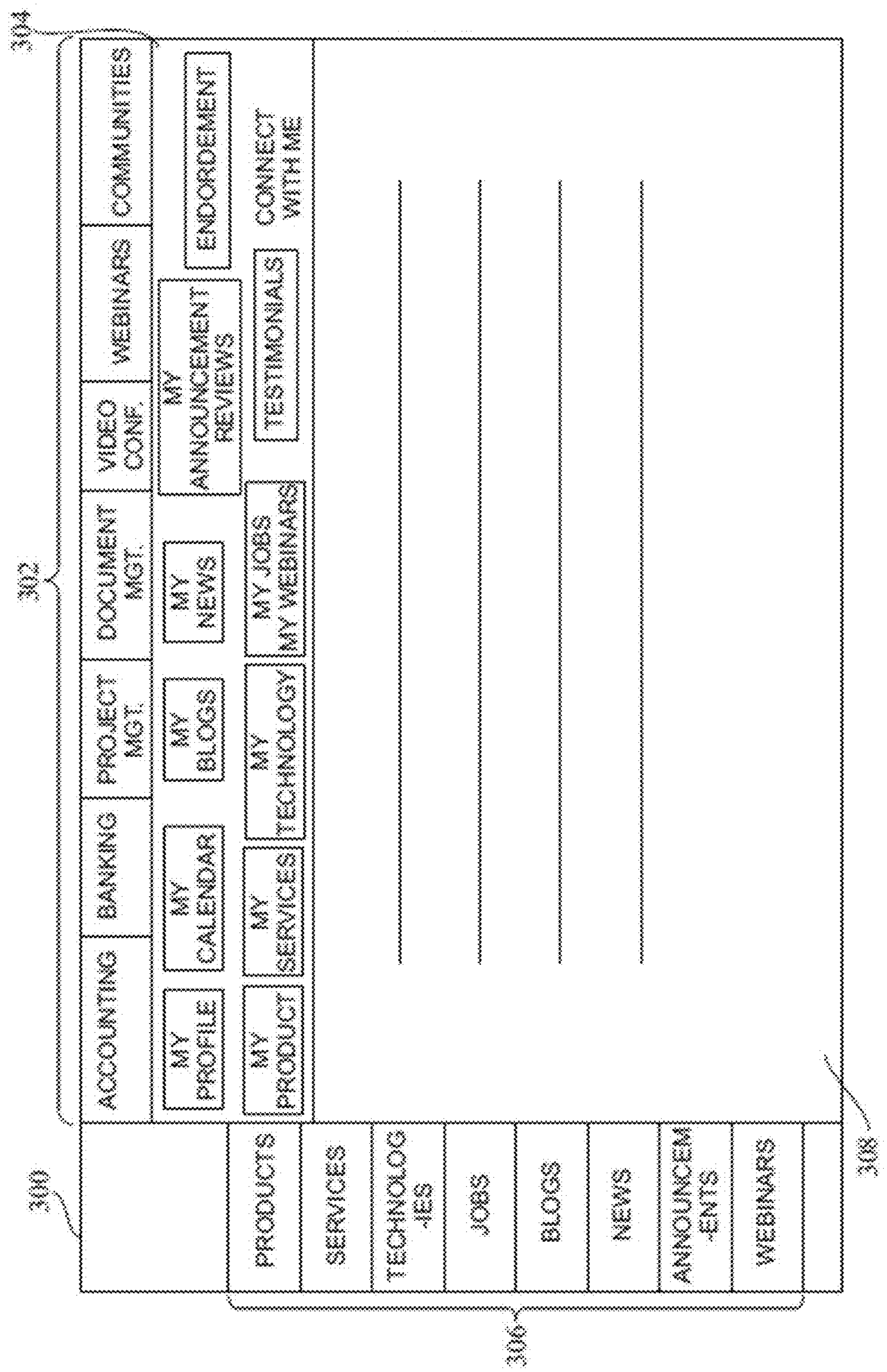
FIG. 3 illustrates an exemplary graphical user interface (GUI) allowing one or more users to network, collaborate, market, hire, and sell products and services and access to a variety of business applications through the computer-implemented system and the network architecture depicted in FIG. 1, in accordance with an embodiment of the present disclosure.

FIG. 3 illustrates an exemplary graphical user interface (GUI) 300 allowing the one or more users to network, collaborate, market, hire, and sell products and services and access to a variety of business applications through the computer-implemented system 102 and the network architecture 100 depicted in FIG. 1, in accordance with an embodiment of the present disclosure.

In an exemplary embodiment, the GUI 300 provides access to the one or more in-platform applications 116 such as a plurality of network and business applications 302, the one or more third-party applications 122 and one or more third-party tools 124, which may include, but are not limited to: accounting applications, banking services, project management applications, document management applications, video conferencing platforms, webinar hosting platforms, and internal or external community-based collaboration tools. The GUI 300 further enables access to a plurality of content and system-linked items 306, such as products, services, technologies, job opportunities, blogs, news updates, platform announcements, and scheduled webinars.

Upon selection or execution of any one of the applications from the plurality of network and business applications 302, the GUI 300 dynamically updates a designated display area 308 to present content and contextual data relevant to the selected application, task, or service. The GUI 300 is also configurable to allow user-specific customization through a plurality of user interface icons 304, each linked to a distinct category of user-generated or system-linked data. The user interface icons 304 may provide direct access to elements such as: My profile (linked to the user profile generating subsystem), my product, my calendar (linked to the time management application), my services, my blogs, my technologies, my jobs, my webinars, my announcements/reviews, testimonials, endorsements, and a connect with me feature for initiating interaction with other users via the communication application or the integrated one or more third-party tools.

Each customizable section is configured to interact with at least one of: the one or more in-platform applications 116, the one or more third-party applications 122, and the one or more third-party tools 124, thereby enabling the one or more users to execute the one or more user-specified tasks, manage digital content, and facilitate cross-functional collaboration within the multi-functional framework.

The one or more in-platform applications 116 are implemented for providing the plurality of in-platform networking applications and business applications 302 as a first portion of the plurality of networking applications and business applications. That is, the system 102 in combination with the one or more in-platform applications 116 provide a plethora of embedded in-platform networking applications and business applications for direct access by the start-up and small business owner/entrepreneur users herein that includes, but is not limited to, functions directed to at least identity verification, professional verification, education verification, financial verification, social media networking and communication, instant messaging, calendars, job postings, video conferencing, video interviewing, webinars, product postings, service postings, technology postings, ordering, payments, invoicing, blogging, and story chronicling. Further, in the event a particular functionality is not provided through the one or more in-platform applications 116 then the system 102 in combination with the one or more third-party applications 122 and the one or more third-party tools 124 may be used to access such functionality as provided by third parties (e.g., third-party software vendors). Thus, the system 102 provides for complete networking and business applications coverage on a single platform, depending upon the needs and requests of the start-up and small business owner/entrepreneur users.

Figure 4:
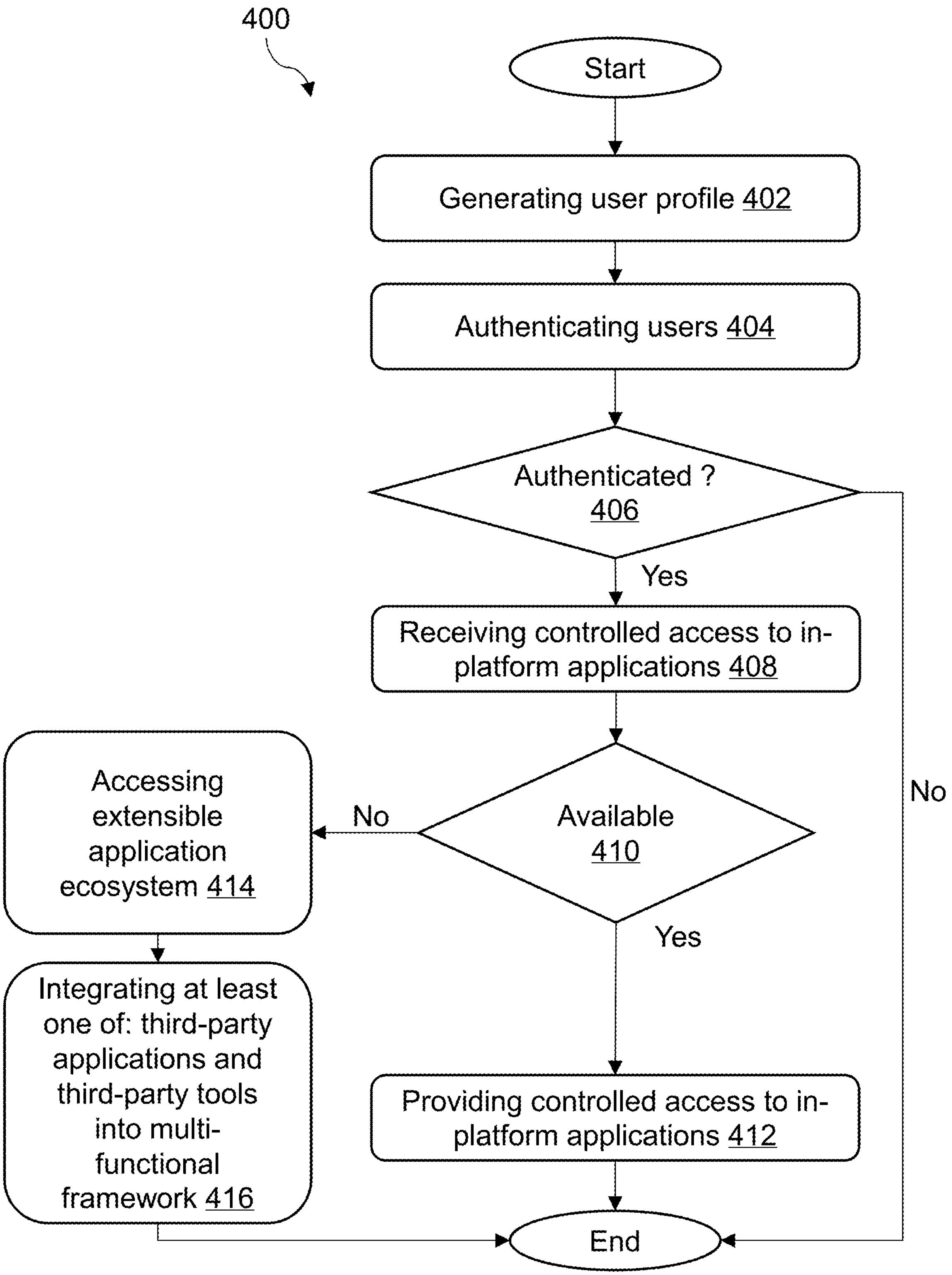
FIG. 4 illustrates an exemplary flowchart of illustrative operations of a methodology for allowing the one or more users to network, collaborate, market, hire, and sell products and services and access to a variety of business applications through the computer-implemented system and the network architecture depicted in FIG. 1, in accordance with an embodiment of the present disclosure.

FIG. 4 illustrates an exemplary flowchart of illustrative operations of a methodology 400 for allowing the one or more users to network, collaborate, market, hire, and sell products and services and access to a variety of business applications through the computer-implemented system 102 and the network architecture 100 depicted in FIG. 1, in accordance with an embodiment of the present disclosure.

At step 402, the system 102 initiates the process by generating the user profile for each user of the one or more users. The one or more users may include, but are not limited to, start-up founders, small business owners, entrepreneur users, and the like. The profile generation is handled by the user profile generating subsystem 206, which collects and stores the relevant structured metadata and the unstructured metadata.

At step 404, the system 102 proceeds to authenticate the one or more users through the authentication subsystem 210. The authentication may involve verification of at least one of: the facial imagery data, the structured metadata, the unstructured metadata, the government-issued identification documents, the video-based character references, and the financial account verification data, as previously described. This step ensures that only validated the one or more users may proceed further into the multi-functional framework.

At decision step 406, the system 102 determines whether a registered user of the one or more users has been authenticated. If the authentication fails, access to the multi-functional framework is denied, and the operation is terminated, thereby enforcing a high level of security and anti-fraud protection. If the registered user is successfully authenticated, then at step 408, the system 102 receives one or more in-platform applications 116 access requests. These requests are directed toward accessing native applications hosted within the system 102, such as project management, document management, time management, communication, marketing, analytics applications, and the like.

At decision step 410, the system 102 evaluates whether the requested in-platform application of the one or more in-platform applications 116 is available within the user's access scope, based on role-based permissions managed by the access control subsystem 212. If the requested in-platform application is available, then at step 412, the system 102 proceeds to provide controlled access to the one or more in-platform applications 116. The registered user may then execute the one or more user-specified tasks within the selected in-platform application, either manually or via the AI automation subsystem 216.

If, however, the requested in-platform application is not available, the system 102 then proceeds to step 414, wherein it initiates the process of accessing the extensible application ecosystem 120. This step allows the system 102 to explore externally integrated resources, including the one or more third-party applications 122 and the one or more third-party tools 124, which may serve as alternatives or extensions to the in-platform capabilities.

At step 416, the system 102 performs integration of at least one of: the one or more third-party applications 122 and the one or more third-party tools 124 into the multi-functional framework, using the API subsystem 214. Upon locating a suitable third-party application or tool that fulfills the user's task requirements, the system 102 grants access, thereby enabling seamless task execution across both in-platform and the extensible application ecosystem.

Figure 5A:
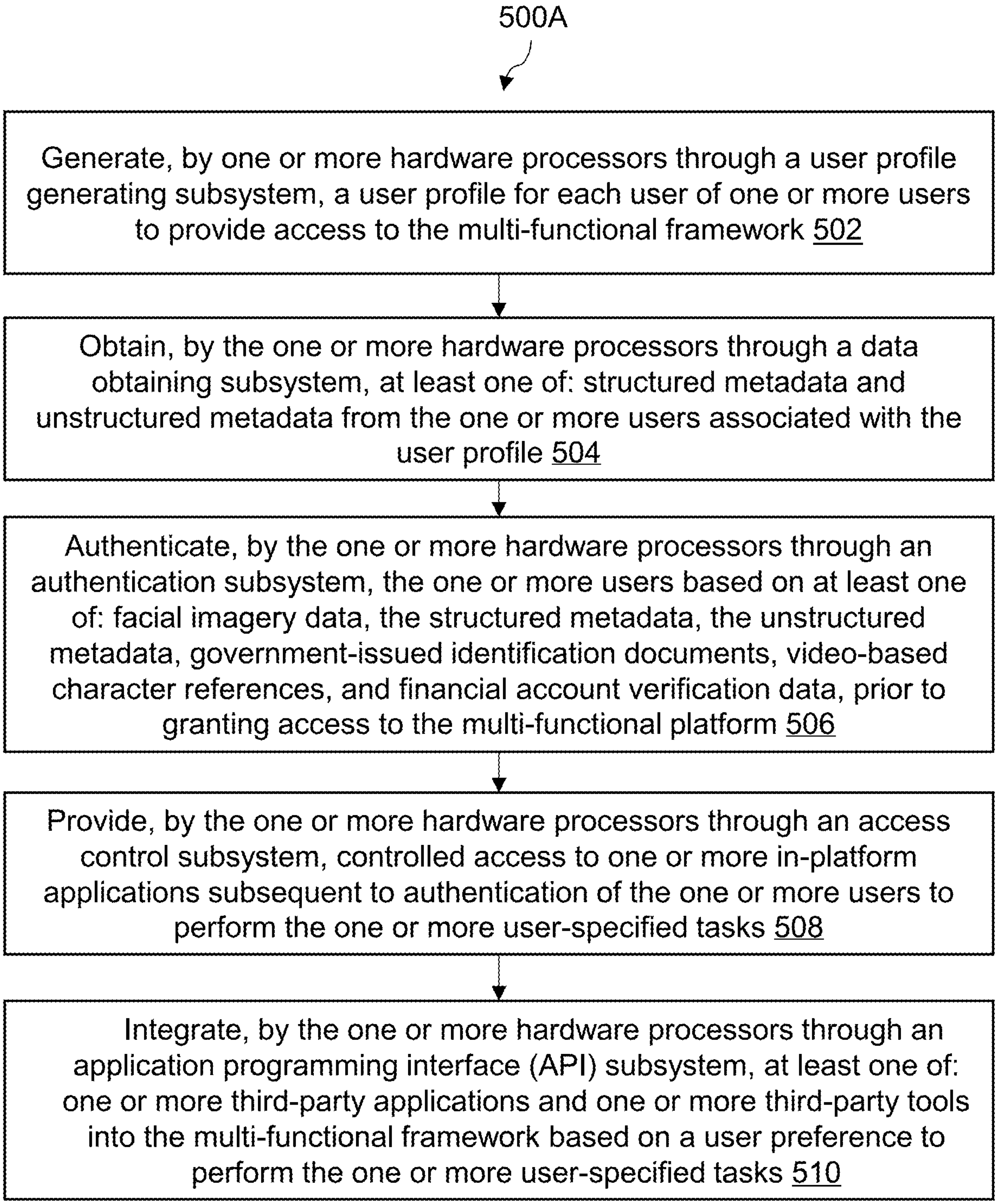
FIG. 5A illustrates exemplary flowchart of a computer-implemented method for providing the multi-functional framework to perform the one or more user-specified tasks, in accordance with an embodiment of the present disclosure.

FIG. 5A illustrates exemplary flowchart of a computer-implemented method 500A for providing the multi-functional framework to perform the one or more user-specified tasks, in accordance with an embodiment of the present disclosure. The method is implemented by the one or more hardware processors of the system executing instructions stored in the memory unit and operating through a plurality of subsystems.

At step 502, the computer-implemented method 500A includes generating, by the one or more hardware processors through the user profile generating subsystem, the user profile for each user of the one or more users to provide access to the multi-functional framework. This step involves receiving personal, professional, and contextual information from the user, including but not limited to, name, contact information, professional background, skills, social media handles, and preferences. The user profile generating subsystem validates and stores this information using a combination of structured input forms and backend validation routines. The resulting user profile is stored in the storage unit 204, and indexed for subsequent use in authentication, personalization, and access control processes.

At step 504, the computer-implemented method 500A includes obtaining, by the one or more hardware processors through the data obtaining subsystem, at least one of: the structured metadata and the unstructured metadata from the one or more users associated with the user profile. The data obtaining subsystem interfaces with both local inputs and external data sources or APIs to collect and normalize this information for use throughout the system.

At step 506, the computer-implemented method 500A includes authenticating, by the one or more hardware processors through the authentication subsystem, the one or more users based on at least one of: the facial imagery data, the structured metadata, the unstructured metadata, the government-issued identification documents, the video-based character references, and the financial account verification data before granting access to the multi-functional platform. The authentication subsystem uses real-time facial recognition, liveness detection, OCR-based document parsing, and cross-checking of data fields to validate the identity of users. This process ensures high security and integrity, mitigating impersonation or fraud before the user is granted access to core functionality.

At step 508, the computer-implemented method 500A includes providing, by the one or more hardware processors through the access control subsystem, controlled access to the one or more in-platform applications after authentication of the one or more users to perform the one or more user-specified tasks. The access control subsystem evaluates the permissions and role-based policies associated with each authenticated user and grants access to specific applications such as document management, project management, time scheduling, financial operations, or user analytics. These permissions are defined in accordance with organizational roles, subscription levels, or administrator-defined policies and may be dynamically adjusted based on system behavior or system feedback.

At step 510, the computer-implemented method 500A includes integrating, by the one or more hardware processors through the API subsystem, at least one of: the one or more third-party applications and the one or more third-party tools into the multi-functional framework based on the user preference to perform the one or more user-specified tasks. The API subsystem executes integration protocols, which may involve generating and storing API keys, acquiring authorization tokens, and installing compatible libraries or SDKs to enable secure communication with external platforms. Examples of third-party integrations include accounting software, CRM tools, cloud storage systems, social media platforms, webinar hosting services, and communication tools. The API subsystem ensures interoperability and real-time data exchange between internal and external services, enabling the user to complete tasks seamlessly across the unified system.

Figure 5B:
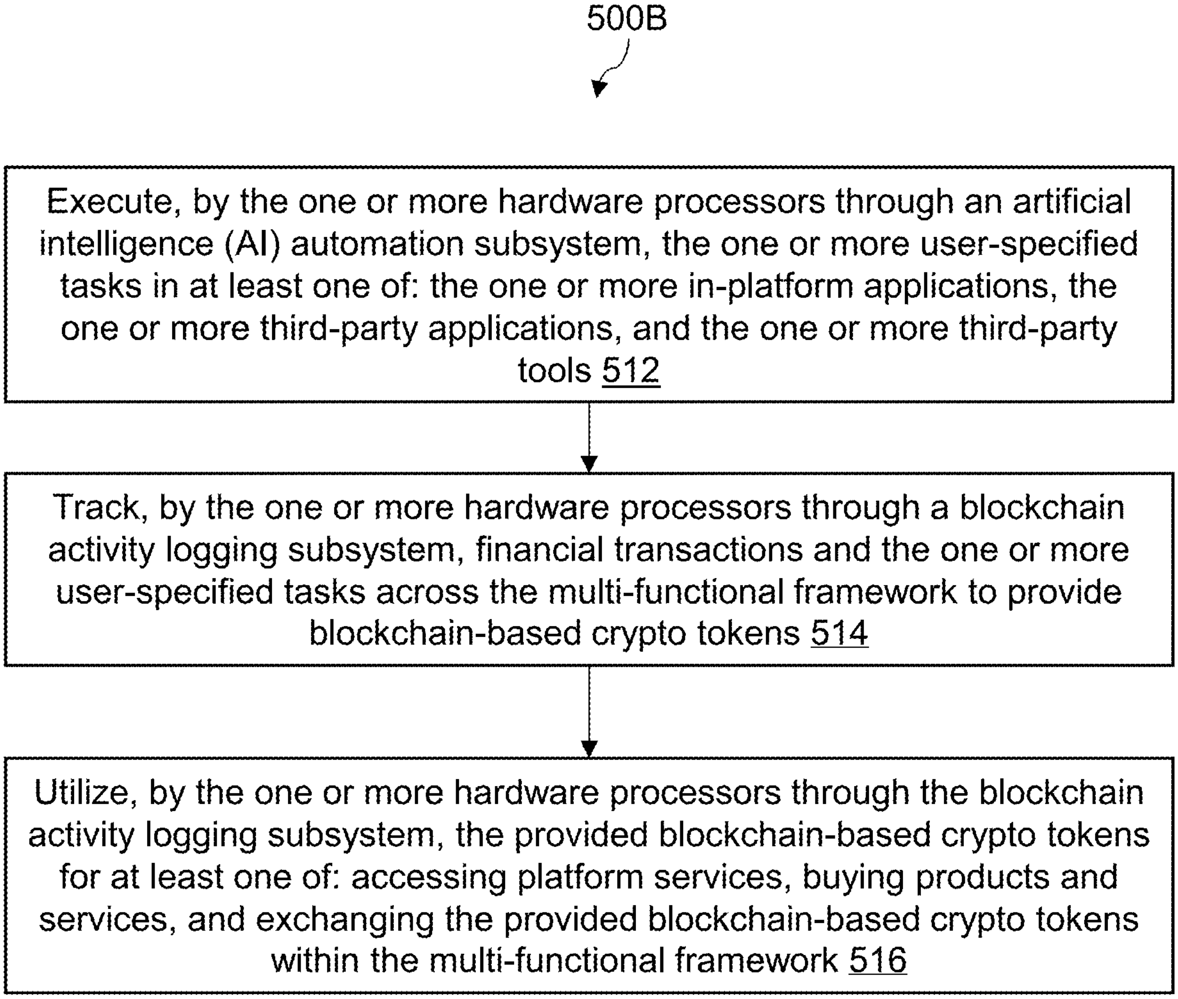
FIG. 5B illustrates an exemplary flowchart of a computer-implemented method for integrating artificial intelligence (AI) automation and gamification using blockchain-based crypto tokens, in accordance with an embodiment of the present disclosure.

FIG. 5B illustrates an exemplary flowchart of a computer-implemented method 500B for integrating artificial intelligence (AI) automation and gamification using blockchain-based crypto tokens, in accordance with an embodiment of the present disclosure.

At step 512, the computer-implemented method 500B includes executing, by the one or more hardware processors through the AI automation subsystem, the one or more user-specified tasks in at least one of: the one or more in-platform applications, the one or more third-party applications, and the one or more third-party tools. The AI automation subsystem is configured to interpret task-related user input, behavior patterns, or workflow triggers to autonomously perform actions such as generating reports, scheduling events, sending communications, publishing content, or processing transactions. Execution is performed using AI models including, but not limited to, rule-based logic, supervised machine learning, or the natural language processing techniques. The AI automation subsystem may dynamically select the appropriate application or tool to fulfill the task, and invoke the required APIs, user interface elements, or backend logic to complete the task without direct user intervention. The AI automation subsystem ensures task completion status is monitored and appropriately logged for future auditing or automation refinement.

At step 514, the computer-implemented method 500B includes tracking, by the one or more hardware processors through a blockchain activity logging subsystem, financial transactions and the one or more user-specified tasks across the multi-functional framework to provide blockchain-based crypto tokens. The blockchain activity logging subsystem operates as a decentralized, tamper-evident ledger module that records each qualifying user action and transaction in the form of verifiable data entries on a blockchain network. The blockchain activity logging subsystem may use smart contracts or system-defined reward rules to assess and log metrics such as task type, time taken, user ID, transaction amount, or engagement level. These entries are cryptographically hashed and timestamped before being committed to the ledger. Based on the recorded data and the applicable reward logic, the blockchain activity logging subsystem determines a token issuance value and allocates blockchain-based crypto tokens to the authenticated user's account or digital wallet.

At step 516, the computer-implemented method 500B includes utilizing, by the one or more hardware processors through the blockchain activity logging subsystem, the provided blockchain-based crypto tokens for at least one of: accessing platform services, buying products and services, and exchanging the provided blockchain-based crypto tokens within the multi-functional framework. The blockchain activity logging subsystem enables the one or more users to redeem the earned blockchain-based crypto tokens for enhanced platform functionality, premium content, access to exclusive applications, or participation in internal marketplaces. The blockchain-based crypto tokens may also be used to facilitate peer-to-peer or user-to-platform exchanges for tangible or digital goods and services. The blockchain activity logging subsystem ensures that all blockchain-based crypto tokens usage events are validated through smart contract-based authorization rules, and each blockchain-based crypto token transaction is securely logged on the blockchain to maintain transparency, traceability, and compliance with system rules. This token-based engagement model adds a gamified and incentive-driven layer to the user experience, encouraging sustained participation and value creation within the multi-functional framework.

Figure 6:
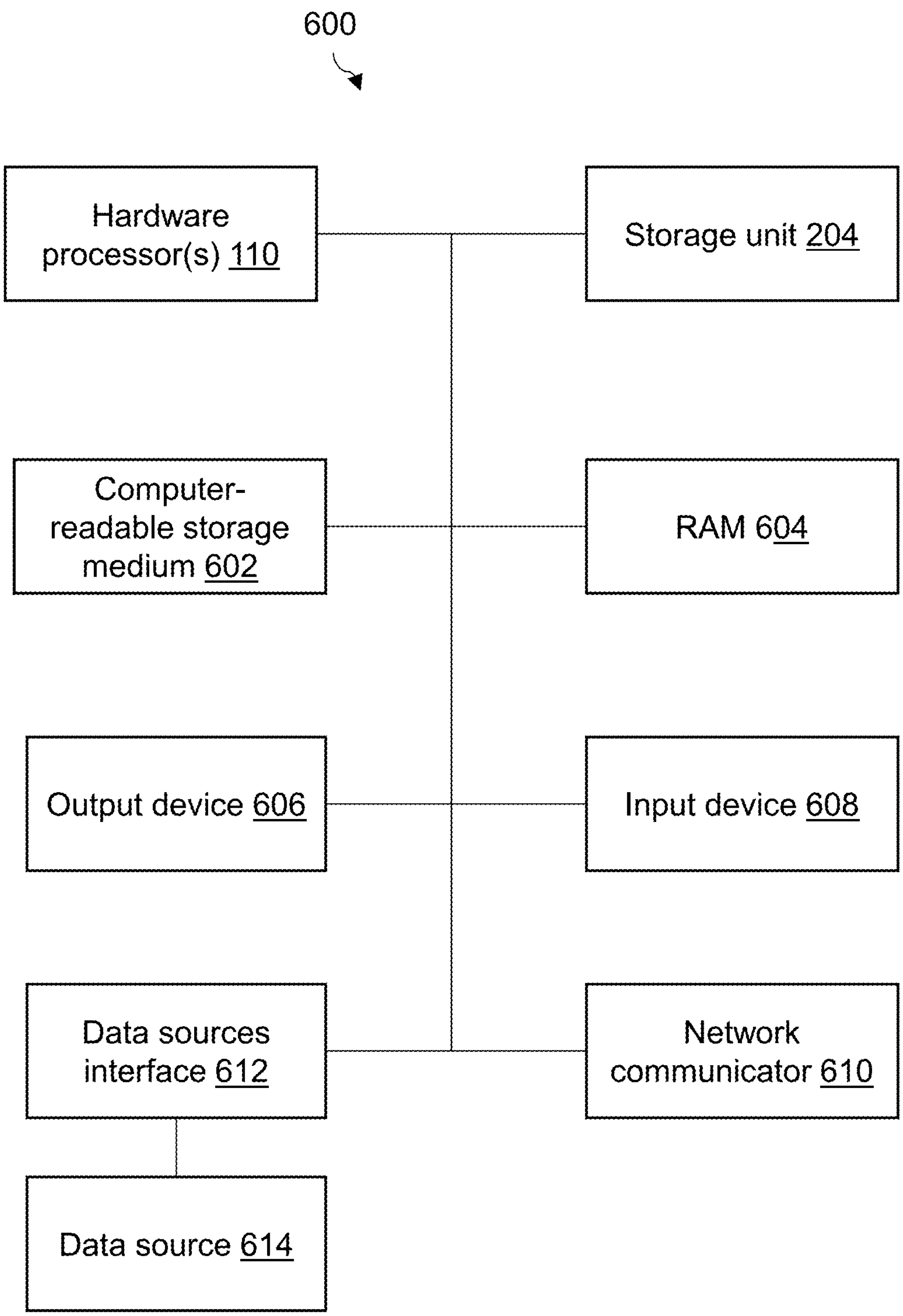
FIG. 6 illustrates an exemplary block diagram representation of one or more server platforms for implementation of the disclosed computer-implemented system, in accordance with an embodiment of the present disclosure.

FIG. 6 illustrates an exemplary block diagram representation of one or more server platforms 600 for implementation of the disclosed computer-implemented system, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the one or more server platforms 600. As illustrated, the one or more server platforms 600 may include additional components not shown, and some of the components described may be removed and/or modified. For example, a computer system with the multiple graphics processing units (GPUs) may be located on at least one of: internal printed circuit boards (PCBs) and external-cloud platforms including the Amazon Web Services (AWS), Google® Cloud Platform (GCP) Microsoft® Azure (Azure), internal corporate cloud computing clusters, or organizational computing resources.

The one or more server platforms 600 may be a computer system such as the system 102 that may be used with the embodiments described herein. The computer system may represent a computational platform that includes components that may be on the one or more servers 108 or another computer system. The computer system may be executed by the one or more hardware processors 110 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110 that execute software instructions or code stored on a non-transitory computer-readable storage medium 602 to perform methods of the present disclosure. The software code includes, for example, instructions to gather data and analyze the network environment data. For example, the plurality of subsystems 114 consists of the user profile generating subsystem 206, the data obtaining subsystem 208, the authentication subsystem 210, the access control subsystem 212, the API subsystem 214, the AI automation subsystem 216, and the blockchain activity logging subsystem 218.

The instructions on the computer-readable storage medium 602 are read and store the instructions in the storage unit 204 or the RAM 604. The storage unit 204 may provide a space for keeping static data where at least some instructions could be stored for later execution. The stored instructions may be further compiled to generate other representations of the instructions and dynamically stored in the RAM 604. The one or more hardware processors 110 may read instructions from the RAM 604 and perform actions as instructed.

The computer system may further include an output device 606 to provide at least some of the results of the execution as output including, but not limited to, visual information of the performance reports to the one or more users. The output device 606 may include a display on computing devices and virtual reality glasses. For example, the display may be a mobile phone screen or a laptop screen. The GUIs 300 and/or text may be presented as an output on the display screen. The computer system may further include an input device 608 to provide the one or more users or another device with mechanisms for entering data and/or otherwise interacting with the computer system. The input device 608 may include, for example, a keyboard, a keypad, a mouse, or a touchscreen. Each of these output devices 606 and input device 608 may be joined by one or more additional peripherals.

A network communicator 610 may be provided to connect the computer system to a network and in turn to other devices connected to the network including other entities, servers, data stores, and interfaces. The network communicator 610 may include, for example, a network adapter such as a LAN adapter or a wireless adapter or any other suitable network interface that supports data transmission using communication protocols such as HTTP, HTTPS, WebSockets, or REST APIs. This network connection enables the system to access external services and interact with remote modules in real time.

The computer system may further include a data sources interface 612 to access a data source 614. The data source 614 may be an information resource about the one or more third-party applications 122, and the one or more third-party tools 124 integrated into the multi-functional framework. The data source 614 may also include the one or more databases 104, which store exception cases, operational rules, system policies, and platform-specific logic that govern how tasks are executed, validated, and logged by various subsystems such as the AI automation subsystem 216, the API subsystem 214, and the blockchain activity logging subsystem 218.

Moreover, the data source 614 may comprise curated knowledge repositories, machine learning models, historical user interaction data, task flow definitions, and pre-trained automation scripts. These may be used by the AI automation subsystem to optimize the execution of user-specified tasks or by the authentication subsystem to cross-reference identity documents or behavioral metadata. Additionally, the data source 614 may include libraries containing, but not limited to, datasets related to accounting standards, document templates, scheduling models, marketing rulesets, token economics, or regulatory compliance frameworks. These libraries may be dynamically accessed by the system's various components during runtime to enable intelligent decision-making, seamless integration, and policy-driven execution across both in-platform and third-party application environments.

Numerous advantages of the present disclosure may be apparent from the discussion above. In accordance with the present disclosure, the system for providing the multi-functional framework to perform the one or more user-specified tasks offers a unified, secure, and intelligent digital environment that streamlines business operations for the one or more users such as start-up founders, entrepreneurs, and small business owners. The system overcomes the inefficiencies and fragmentation inherent in traditional siloed tools by integrating the one or more in-platform applications and the one or more third-party applications 122, and the one or more third-party tools 124 within a single extensible platform.

One advantage of the present invention is its ability to automate routine and complex user-specified tasks using the AI automation subsystem (the AI chatbot), thereby reducing manual workload, enhancing task accuracy, and improving operational speed. Another benefit is the inclusion of a robust authentication subsystem that employs multiple verification layers including facial imagery, government-issued documents, and financial account data, ensuring high platform security and mitigating fraud.

The blockchain activity logging subsystem offers further advantages by providing transparent tracking of user actions and financial transactions and issuing the blockchain-based crypto tokens that incentivize meaningful engagement. The blockchain-based crypto tokens may be used within the system to access premium services, purchase digital goods, or participate in token-based exchanges, thereby gamifying user interactions and driving ongoing participation.

Additionally, the API subsystem provides seamless interoperability with external services, enabling the one or more users to integrate their existing tools and workflows, such as accounting platforms, communication systems, CRM tools, or cloud storage, with minimal configuration. The system also ensures role-based access control, supports dynamic personalization through user profiles, and facilitates real-time collaboration through applications like document sharing, task management, content publishing, webinars, and video conferencing. By consolidating these diverse capabilities into a single, modular, and cloud-based system, the system delivers a scalable and adaptable infrastructure that simplifies digital operations, enhances productivity, reduces software overhead, and supports end-to-end business management in a cohesive and technologically advanced manner.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented method for providing a multi-functional framework to perform one or more user-specified tasks, comprising:

generating, by one or more hardware processors through a user profile generating subsystem, a user profile for each user of one or more users to provide access to the multi-functional framework;

obtaining, by the one or more hardware processors through a data obtaining subsystem, at least one of: structured metadata and unstructured metadata from the one or more users associated with the user profile;

authenticating, by the one or more hardware processors through an authentication subsystem, the one or more users based on at least one of: facial imagery data, the structured metadata, the unstructured metadata, government-issued identification documents, video-based character references, and financial account verification data, prior to granting access to the multi-functional platform;

providing, by the one or more hardware processors through an access control subsystem, controlled access to one or more in-platform applications subsequent to authentication of the one or more users to perform the one or more user-specified tasks; and integrating, by the one or more hardware processors through an application programming interface (API) subsystem, at least one of: one or more third-party applications and one or more third-party tools into the multi-functional framework based on a user preference to perform the one or more user-specified tasks, wherein integrating at least one of: the one or more third-party applications and the one or more third-party tools, comprises:

obtaining one or more API keys and one or more authentication tokens associated with at least one of: the one or more third-party applications and the one or more third-party tools from extensible application ecosystem, wherein the one or more API keys and the one or more authentication tokens generated in the extensible application ecosystem associated with at least one of: the one or more third-party applications and the one or more third-party tools;

installing one of: one or more additional libraries and one or more platform-specific building tools to interact with the multi-functional framework using a hypertext preprocessor (PHP) procedure;

initiating API calls using the PHP procedure to the extensible application ecosystem;

receiving API responses for the initiated API calls, from the extensible application ecosystem in a structured data format including at least one of: JavaScript Object Notation (JSON) and Extensible Markup Language (XML); and parsing the API responses to extract relevant task-related data to perform the one or more user-specified tasks.

2. The computer-implemented method of claim 1, further comprises:

executing, by the one or more hardware processors through an artificial intelligence (AI) automation subsystem, the one or more user-specified tasks in at least one of: the one or more in-platform applications, the one or more third-party applications, and the one or more third-party tools;

tracking, by the one or more hardware processors through a blockchain activity logging subsystem, financial transactions and the one or more user-specified tasks across the multi-functional framework to provide blockchain-based crypto tokens; and utilizing, by the one or more hardware processors through the blockchain activity logging subsystem, the provided blockchain-based crypto tokens for at least one of: accessing platform services, buying products and services, and exchanging the provided blockchain-based crypto tokens within the multi-functional framework.

3. The computer-implemented method of claim 1, wherein the structured metadata comprises at least one of: personal identification data, professional information, educational information, professional licenses and certifications, social and online presence data, skill attributes, publication details, and geolocation data; and the unstructured metadata comprises at least one of: user-generated content, video recordings, image and media uploads, voice inputs, and behavioral logs.

4. The computer-implemented method of claim 1, wherein the authentication subsystem further comprises:

analyzing the facial imagery data from a real-time video stream to perform facial recognition and liveness detection;

extracting at least one of: textual features and visual features from the government-issued identification documents using at least one of: an optical character recognition (OCR) and image analysis techniques; and mapping at least one of: the textual features and the visual features against the facial imagery data to authenticate the one or more users in real time.

5. The computer-implemented method of claim 1, wherein the one or more in-platform applications comprises at least one of:

a time management application configured for coordinating at least one of: meetings, events, and availability;

a communication application configured for real-time voice and text communication, announcements, notifications, webinars, presentations, and virtual meetings;

a project management application configured for at least one of: creating tasks, assigning tasks, updating tasks, and tracking at least one of: tasks, milestones, deadlines, and resource allocations across a plurality of teams;

a customer relationship management (CRM) application configured for at least one of: managing customer profiles, tracking sales pipelines, recording communication history, organizing support tickets, and facilitating lead conversion;

a document management application configured for at least one of: uploading, storing, sharing, editing, and electronically executing corporate documents and files within the multi-functional framework;

a talent acquisition application configured for publishing employment opportunities and conducting interviews;

a content publishing application configured for uploading and publishing at least one of: user-generated videos, blogs, reviews, endorsements, hosting webinars, promotional video contents, and multimedia campaigns;

a marketing application configured for at least one of: listing products and services, bidding on products and services, purchasing products, and services;

a financial operations application configured for managing at least one of: payments, invoicing, financial transactions, accounting, ledger management, financial reporting, tax computation and compliance, general journal entries, bank reconciliation, and depreciation tracking; and a user analytics application configured for at least one: tracking performance, engagement metrics, and activity history.

6. The computer-implemented method of claim 1, wherein at least one of: the one or more third-party applications and the one or more third-party tools comprise at least one of: accounting applications, project management tools, customer relationship management tools, payment gateways, communication tools, cloud storage service tools, social media platforms, document management tools, webinar hosting platforms, and video marketing platforms.

7. The computer-implemented method of claim 1, wherein the one or more user-specified tasks comprises at least one of: document management, project management, social media management, financial management, accounting management activities, scheduling meetings, initiating communication, webinar hosting, video marketing, talent acquisition activities, and consumer transaction services.

8. A computer-implemented system for providing a multi-functional framework to perform one or more user-specified tasks, comprising:

one or more servers;

one or more hardware processors;

a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

a user profile generating subsystem configured to generate a user profile for each user of one or more users to provide access to the multi-functional framework;

a data obtaining subsystem configured to obtain at least one of: structured metadata and unstructured metadata from the one or more users associated with the user profile;

an authentication subsystem configured to authenticate the one or more users based on at least one of: facial imagery data, the structured metadata, the unstructured metadata, government-issued identification documents, video-based character references, and financial account verification data, prior to granting access to the multi-functional platform;

an access control subsystem configured to provide controlled access to one or more in-platform applications subsequent to authentication of the one or more users for performing the one or more user-specified tasks; and an application programming interface (API) subsystem configured to integrate at least one of: one or more third-party applications and one or more third-party tools into the multi-functional framework based on a user preference to perform the one or more user-specified tasks, wherein the application programming interface (API) subsystem configured to:

obtain one or more API keys and one or more authentication tokens associated with at least one of: the one or more third-party applications and the one or more third-party tools from extensible application ecosystem, wherein the one or more API keys and the one or more authentication tokens generated in the extensible application ecosystem associated with at least one of: the one or more third-party applications and the one or more third-party tools;

install one of: one or more additional libraries and one or more platform-specific building tools to interact with the multi-functional framework using a hypertext preprocessor (PHP) procedure;

initiate API calls using the PHP procedure to the extensible application ecosystem;

receive API responses for the initiated API calls, from the extensible application ecosystem in a structured data format including at least one of: JavaScript Object Notation (JSON) and Extensible Markup Language (XML); and parse the API response to extract relevant task-related data to perform the one or more user-specified tasks.

9. The computer-implemented system of claim 8, further comprises:

an artificial intelligence (AI) automation subsystem configured to execute the one or more user-specified tasks in at least one of: the one or more in-platform applications, the one or more third-party applications, and the one or more third-party tools; and a blockchain activity logging subsystem configured to:

track financial transactions and the one or more user-specified tasks across the multi-functional framework to provide blockchain-based crypto tokens; and utilize the provided blockchain-based crypto tokens for at least one of: accessing platform services, buying products and services, and exchanging the provided blockchain-based crypto tokens within the multi-functional framework.

10. The computer-implemented system of claim 8, wherein the structured metadata comprises at least one of: personal identification data, professional information, educational information, professional licenses and certifications, social and online presence data, skill attributes, publication details, geolocation data; and the unstructured metadata comprises at least one of: user-generated content, video recordings, image and media uploads, voice inputs, behavioral logs.

11. The computer-implemented system of claim 8, wherein the authentication subsystem is configured to:

analyze the facial imagery data from a real-time video stream to perform facial recognition and liveness detection;

extract at least one of: textual features and visual features from the government-issued identification documents using at least one of: an optical character recognition (OCR) and image analysis techniques; and map at least one of: the textual features and the visual features against the facial imagery data to authenticate the one or more users in real time.

12. The computer-implemented system of claim 8, wherein the one or more in-platform applications comprises at least one of:

a time management application for coordinating at least one of: meetings, events, and availability;

a communication application for real-time voice and text communication, announcements, notifications, webinars, presentations, and virtual meetings;

a project management application for at least one of: creating tasks, assigning tasks, updating tasks, and tracking at least one of: tasks, milestones, deadlines, and resource allocations across a plurality of teams;

a customer relationship management (CRM) application for at least one of: managing customer profiles, tracking sales pipelines, recording communication history, organizing support tickets, and facilitating lead conversion;

a document management application configured for at least one of: uploading, storing, sharing, editing, and electronically executing corporate documents and files within the multi-functional framework;

a talent acquisition application for publishing employment opportunities and conducting interviews;

a content publishing application for uploading and publishing at least one of: user-generated videos, blogs, reviews, endorsements, hosting webinars, promotional video contents, and multimedia campaigns;

a marketing application for at least one of: listing products and services, bidding on products and services, purchasing products, and selling services;

a financial operations application for managing at least one of: payments, invoicing, financial transactions, accounting, ledger management, financial reporting, tax computation and compliance, general journal entries, bank reconciliation, and depreciation tracking; and a user analytics application for at least one: tracking performance, engagement metrics, and activity history.

13. The computer-implemented system of claim 8, wherein at least one of: the one or more third-party applications and the one or more third-party tools comprise at least one of: accounting applications, project management tools, customer relationship management tools, payment gateways, communication tools, cloud storage service tools, social media platforms, document management tools, webinar hosting platforms, and video marketing platforms.

14. The computer-implemented system of claim 8, wherein the one or more user-specified tasks comprises at least one of: document management, project management, social media management, financial management, accounting management activities, scheduling meetings, initiating communication, webinar hosting, video marketing, talent acquisition activities, and consumer transaction services.

15. A non-transitory computer-readable storage medium storing computer-executable instructions that, when executed by one or more hardware processors, cause the one or more hardware processors to perform operations for providing a multi-functional framework to perform one or more user-specified tasks, the operations comprising:

generating a user profile for each user of one or more users to provide access to the multi-functional framework;

obtaining at least one of: structured metadata and unstructured metadata from one or more users associated with the user profile;

authenticating the one or more users based on at least one of: facial imagery data, the structured metadata, the unstructured metadata, government-issued identification documents, video-based character references, and financial account verification data, prior to granting access to the multi-functional platform;

providing controlled access to one or more in-platform applications subsequent to authentication of the one or more users to perform the one or more user-specified tasks; and integrating at least one of: one or more third-party applications and one or more third-party tools into the multi-functional framework based on a user preference to perform the one or more user-specified tasks, wherein integrating at least one of: the one or more third-party applications and the one or more third-party tools, comprises:

obtaining one or more API keys and one or more authentication tokens associated with at least one of: the one or more third-party applications and the one or more third-party tools from extensible application ecosystem, wherein the one or more API keys and the one or more authentication tokens generated in the extensible application ecosystem associated with at least one of: the one or more third-party applications and the one or more third-party tools;

installing one of: one or more additional libraries and one or more platform-specific building tools to interact with the multi-functional framework using a hypertext preprocessor (PHP) procedure;

initiating application programming interface (API) calls using the hypertext preprocessor (PHP) procedure to the extensible application ecosystem;

receiving API responses for the initiated API calls, from the extensible application ecosystem in a structured data format including at least one of: JavaScript Object Notation (JSON) and Extensible Markup Language (XML); and parsing the API responses to extract relevant task-related data to perform the one or more user-specified tasks.

16. The non-transitory computer-readable storage medium of claim 15, further comprises:

executing the one or more user-specified tasks in at least one of: the one or more in-platform applications, the one or more third-party applications, and the one or more third-party tools;

tracking financial transactions and the one or more user-specified tasks across the multi-functional framework to provide blockchain-based crypto tokens; and utilizing, by the one or more hardware processors through the blockchain activity logging subsystem, the provided blockchain-based crypto tokens for at least one of: accessing platform services, buying products and services, and exchanging the provided blockchain-based crypto tokens within the multi-functional framework.

17. The non-transitory computer-readable storage medium of claim 15, authenticating comprises:

analyzing the facial imagery data from a real-time video stream to perform facial recognition and liveness detection;

extracting at least one of: textual features and visual features from the government-issued identification documents using at least one of: an optical character recognition (OCR) and image analysis techniques; and mapping at least one of: the textual features and the visual features against the facial imagery data to authenticate the one or more users in real time.

18. The non-transitory computer-readable storage medium of claim 15, wherein the one or more in-platform applications comprises at least one of:

a time management application for coordinating at least one of: meetings, events, and availability;

a communication application for real-time voice and text communication, announcements, notifications, webinars, presentations, and virtual meetings;

a project management application for at least one of: creating tasks, assigning tasks, updating tasks, and tracking at least one of: tasks, milestones, deadlines, and resource allocations across a plurality of teams;

a customer relationship management (CRM) application for at least one of: managing customer profiles, tracking sales pipelines, recording communication history, organizing support tickets, and facilitating lead conversion;

a document management application configured for at least one of: uploading, storing, sharing, editing, and electronically executing corporate documents and files within the multi-functional framework;

a talent acquisition application for publishing employment opportunities and conducting interviews;

a content publishing application for uploading and publishing at least one of: user-generated videos, blogs, reviews, endorsements, hosting webinars, promotional video contents, and multimedia campaigns;

a marketing application for at least one of: listing products and services, bidding on products and services, purchasing products and selling services;

a financial operations application for managing at least one of: payments, invoicing, financial transactions, accounting, ledger management, financial reporting, tax computation and compliance, general journal entries, bank reconciliation, and depreciation tracking; and a user analytics application for at least one: tracking performance, engagement metrics, and activity history.

19. The non-transitory computer-readable storage medium of claim 15, wherein at least one of: the one or more third-party applications and the one or more third-party tools comprise at least one of: accounting applications, project management tools, customer relationship management tools, payment gateways, communication tools, cloud storage service tools, social media platforms, document management tools, webinar hosting platforms, and video marketing platforms.

20. The non-transitory computer-readable storage medium of claim 15, wherein the one or more user-specified tasks comprises at least one of: document management, project management, social media management, financial management, accounting management activities, scheduling meetings, initiating communication, webinar hosting, video marketing, talent acquisition activities, and consumer transaction services.

* * * * *